US012551996B2

(12) United States Patent
McClung et al.

(10) Patent No.: US 12,551,996 B2
(45) Date of Patent: Feb. 17, 2026

(54) TORQUE CONTROL TOOL

(71) Applicant: Ingersoll-Rand Industrial U.S., Inc., Davidson, NC (US)

(72) Inventors: Mark T. McClung, Byram Township, NJ (US); Timothy R. Cooper, Titusville, NJ (US); Warren A. Seith, Bethlehem, PA (US); Douglas E. Pyles, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/914,831

(22) Filed: Oct. 14, 2024

(65) Prior Publication Data

US 2025/0128387 A1 Apr. 24, 2025

Related U.S. Application Data

(63) Continuation-in-part of application No. 17/064,764, filed on Oct. 7, 2020, now abandoned.

(51) Int. Cl.
*B25B 21/02* (2006.01)
*B25B 23/147* (2006.01)

(52) U.S. Cl.
CPC .......... *B25B 23/1475* (2013.01); *B25B 21/02* (2013.01)

(58) Field of Classification Search
CPC . B25B 21/02; B25B 23/1453; B25B 23/1456; B25B 23/1475
See application file for complete search history.

(56) References Cited

U.S. PATENT DOCUMENTS

| | | | | |
|---|---|---|---|---|
| 4,316,512 A * | 2/1982 | Kibblewhite | G01D 5/24404 173/183 |
| 6,371,218 B1 * | 4/2002 | Amano | B25B 23/1475 173/183 |
| 6,945,337 B2 * | 9/2005 | Kawai | B25B 21/026 173/183 |
| 6,978,846 B2 * | 12/2005 | Kawai | B25B 23/1405 173/183 |
| 7,155,986 B2 * | 1/2007 | Kawai | B25B 23/1475 73/862.21 |

(Continued)

FOREIGN PATENT DOCUMENTS

| | | |
|---|---|---|
| CN | 1824464 A | 8/2006 |
| CN | 104290067 A | 1/2015 |

(Continued)

OTHER PUBLICATIONS

Extended European Search Report for Application No. 21197883.8, dated Feb. 18, 2022.

(Continued)

*Primary Examiner* — Anna K Kinsaul
*Assistant Examiner* — David G Shutty
(74) *Attorney, Agent, or Firm* — Kevin E. West; Advent, LLP

(57) ABSTRACT

A power tool and method of controlling a motor of the power tool based on a determination of torque is provided. The method of determining torque uses the energy output by the drive mechanism and the angle of rotation of the output shaft to estimate torque. The energy is determined by subtracting efficiency losses (or gains) from a nominal energy of the drive mechanism in order to improve the torque estimation.

20 Claims, 3 Drawing Sheets

(56) References Cited

U.S. PATENT DOCUMENTS 9,089,956 B2 * 7/2015 Arimura ............. B25B 23/1475
9,701,000 B2 * 7/2017 Sekino .................... B25B 21/02
11,097,405 B2 * 8/2021 Seith ..................... B25B 21/026
11,292,112 B2 * 4/2022 Gaul ................... B25B 23/1475
11,731,253 B2 * 8/2023 Seith ....................... B25B 21/02 173/183
2001/0032726 A1 10/2001 Cripe et al.
2002/0035876 A1 3/2002 Donaldson
2004/0045729 A1 3/2004 Lehnert et al.
2005/0109519 A1 5/2005 Kawai et al.
2005/0167130 A1 * 8/2005 Setter .................. B25B 23/1405 173/176
2007/0103104 A1 * 5/2007 May .................... B25B 23/1405 318/432
2008/0099217 A1 * 5/2008 Seith ..................... B25B 21/026 173/1
2009/0014192 A1 * 1/2009 Ito ....................... B25B 23/1405 173/217
2009/0308624 A1 * 12/2009 Shibata ............... B25B 23/1405 173/176
2012/0318550 A1 12/2012 Tanimoto et al.
2012/0318552 A1 * 12/2012 May .................... B25B 23/1456 173/128
2014/0096985 A1 * 4/2014 Chu .................... B25B 23/1405 173/1
2015/0021062 A1 1/2015 Sekino et al.
2015/0231770 A1 * 8/2015 Kusakawa .......... B25B 23/1475 173/93.5
2016/0325414 A1 * 11/2016 Mizuno ............... B25B 23/1453
2019/0022836 A1 1/2019 Chu et al.
2019/0030696 A1 1/2019 Seith et al.
2019/0232471 A1 * 8/2019 Paoli ..................... B23P 19/066
2019/0321949 A1 * 10/2019 Miyazaki ........... G05B 19/0405
2022/0105611 A1 * 4/2022 McClung ............ B25B 23/1475
2025/0128387 A1 * 4/2025 McClung ................ B25B 21/02
2025/0158437 A1 * 5/2025 Campbell ............ G01R 31/388

FOREIGN PATENT DOCUMENTS

CN 111136606 A 5/2020
DE 102004053288 A1 5/2006
DE 102018208302 A1 11/2019
EP 2826596 A2 1/2015
EP 3093106 A1 11/2016
KR 20200102574 A 9/2020

OTHER PUBLICATIONS

Second Office Action in China for Application No. 202111134850.7, dated Dec. 12, 2025.

* cited by examiner

TORQUE CONTROL TOOL

BACKGROUND

The present disclosure relates to torque tools, and more particularly, to determining a torque applied by a power tool to a fastener.

Torque tools are commonly used in industrial settings to tighten fasteners to a specified torque. However, determining the actual torque applied by a power tool to a fastener can be difficult and inaccurate. Although determining the actual torque applied can be difficult for all power tools, impact wrenches are particularly difficult to accurately determine the actual torque applied to a faster. On the other hand, impact wrenches have several advantages over other torque tools, including a compact size, low tool weight and low cost. Thus, improved techniques for accurately determining the torque applied to a fastener would be desirable.

SUMMARY

An improved power tool with torque control is described. The power tool estimates torque applied to a fastener by measuring the angle of rotation of the fastener and the energy expended by the tool to rotate the fastener through the angle of rotation. The power tool improves on the torque estimation by considering the efficiency of energy expended by the drive mechanism which may result in less energy (or more) being transferred to the fastener. The tool may also include any other aspect described below in the written description or in the attached drawings and any combinations thereof.

BRIEF DESCRIPTION OF SEVERAL VIEWS OF THE DRAWINGS

The Detailed Description is described with reference to the accompanying figures. The use of the same reference numbers in different instances in the description and the figures may indicate similar or identical items.

DETAILED DESCRIPTION

Figure 1:
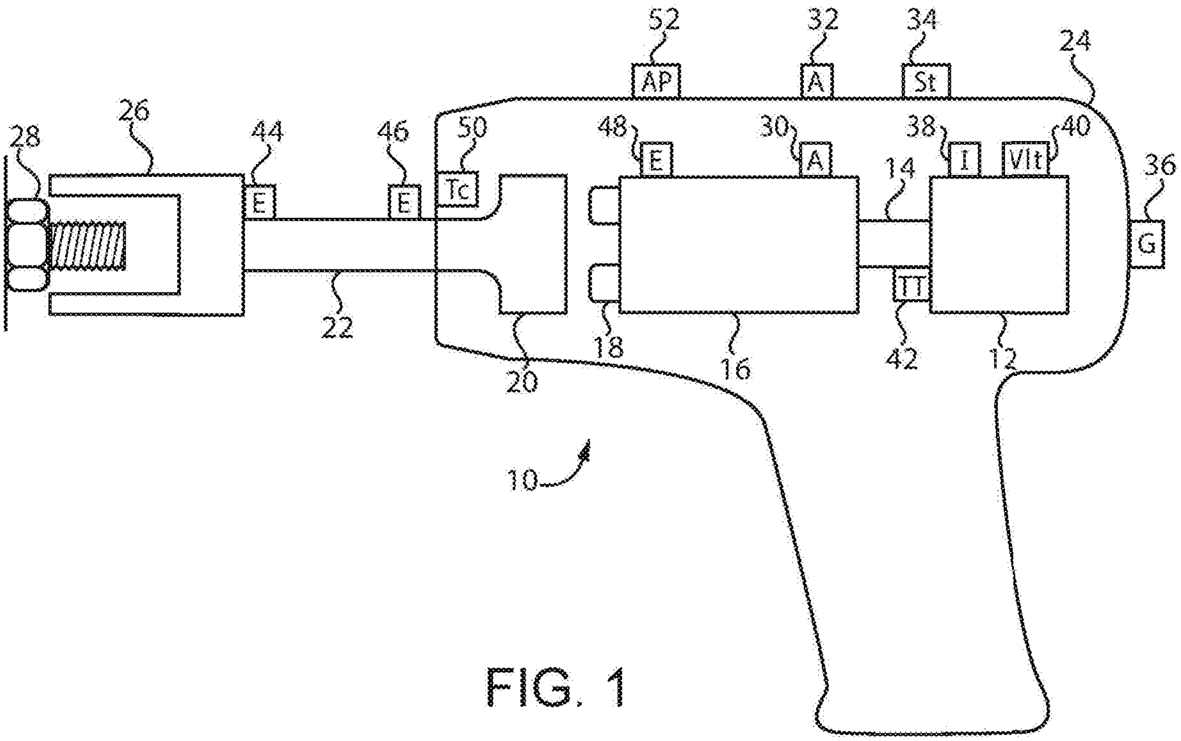
FIG. 1 is a schematic view of an impact wrench.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Estimating the torque applied to a joint resulting from a fastening operation involving discrete blows may use measurements of the angular position of the joint and the change in angular position of the joint with each blow. This information may be coupled with knowledge of the energy in the impact mechanism before and after the blow. Ideally, if the energy leaving the tool in a given blow is measured, the mean torque multiplied by the change in joint angle will be equal to the energy output. Thus, if both the change in joint angle and the amount of energy leaving the tool during each blow are known, the joint torque can be estimated. That is, for a particular blow, the estimated mean joint torque can be determined from the energy that leaves the tool divided by the change in angular position of the threaded joint. It is noted, however, that other schemes involving assumptions about the joint's torque-versus-angle characteristic can also be used in conjunction with angle and energy measurements to estimate joint torque.

Angular position sensors may be placed on the anvil and on the hammer of an impact wrench to determine changes in angle rotation of the output shaft of the tool during a fastener tightening operation. This allows an approximation of the joint angular position and, via differentiating the hammer angular position, provides an estimate of the hammer angular velocity before and after an impact. The velocity change may then be used to determine the change in energy during an impact. That is, the velocity of the hammer will slow due to the impact force, which represents energy which is transferred from the hammer to the output shaft during the impact.

Various sensors may be used to improve torque estimates. A gyro is one type of sensor that may be used for the purpose of compensating for angular motion of the tool when computing angular rotation of the joint. A gyro may also be used to provide housing velocity information. A sudden change in the housing velocity following an impact indicates energy transfer from the mechanism to the housing. In an embodiment, this energy should be subtracted from that assumed to be utilized in tightening the joint. Various other sensors may also be used to improve estimates of joint torque based on tracking energy changes in addition to tracking the energy change of the impacting hammer. That is, additional and/or alternative sensors may be used to capture other energy that is lost and not transferred to the joint. For example, thermocouples may be used to measure the temperature of elements of the power tool, and thus, track changes in the thermal energy due to impact. This is particularly valuable for the impacting members themselves, but may also be extended to other parts of the tool as well. Accelerometer signals may also be integrated to determine the velocity of various components, allowing for the determination of energy associated with movement and vibration. Frequency analysis of accelerations may also be used in conjunction with peak values and analytical modal analysis to determine energies in vibratory modes excited by the impacts. Additional position sensors (e.g., angular and linear) may also be used to measure deformation and hence potential energy of tool components. Strain gauges may be used for a similar purpose. Other sensors that may be used include torque transducers, motor encoders/resolvers, and current and voltage probes. While the sensors mentioned above may be used for an improved torque estimation, it is understood that many other sensors may also be used to estimate energy changes. While the improved torque measurement methods herein are particularly useful with discrete energy tools like impact wrenches, it is understood that the energy tracking and angular measurement methods described herein may also be applied to continuous energy delivery tools.

Turning to FIG. 1, a schematic illustration of a power tool 10 is shown. Although it is understood that the system herein may be applied to other power tools, the schematic of FIG.

1 relates to an impact wrench 10. As in a conventional impact wrench, the wrench 10 has a motor 12 that rotates a drive shaft 14 which drives an impact drive mechanism 16. It is understood that various types of motors and drive mechanisms may be used. However, in an embodiment, the motor 12 is an electric motor 12, and the drive mechanism 16 is a hammer mechanism 16 with jaws 18 that engage and disengage from an anvil 20 on the proximal end of the output shaft 22. The power tool 10 also includes a tool housing 24 that encloses the motor 12 and drive mechanism 16. A socket 26 may be provided on the distal end of the output shaft 22 to engage the nut 28 of a threaded joint.

Figure 2:
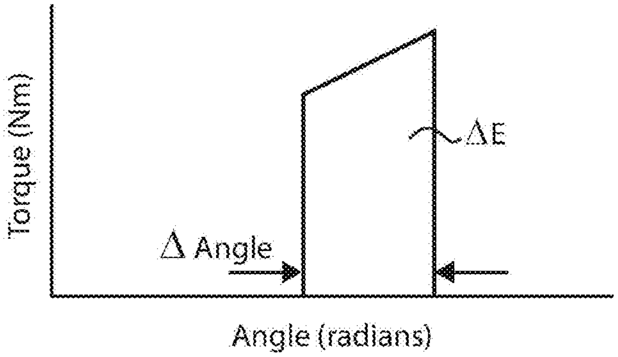
FIG. 2 is a chart showing a relationship between angle of rotation, torque, and energy.

As shown in FIG. 2, the torque applied to the nut 28 through the socket 26 may be determined by knowing the angle of rotation of the output shaft 22 during a single impact of the drive mechanism 26 against the output shaft 22, and the energy transferred to the output shaft 22 by the drive mechanism 26 within the angle of rotation. Based on the known angle of rotation and transferred energy, the torque applied to the nut 28 can be determined by the formula:

$$T = E_H / AR$$

where T is the estimated torque applied to the nut 28, $E_H$ is the change in energy of the hammer 16 (that is, drive mechanism 16) before and after an impact, and AR is the angular rotational movement of the nut 28 during the impact. The estimated torque may also be referred to as a residual torque, which is the torque value of the nut 28 or fastener after the power tool 10 has finished tightening the fastener (or at intermediate tightening steps). In an embodiment, the power tool 10 is provided with a preset torque setting that is stored in a memory storage device that is accessible for reading by controller 60. In a further embodiment, the preset torque setting is user adjustable.

Figure 3:
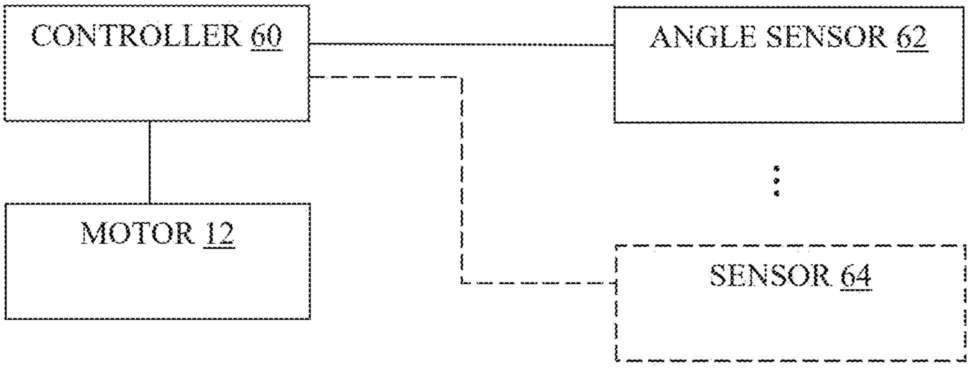
FIG. 3 is a block diagram view of a communications network between a controller, an angle sensor, and one or more sensors.
Figure 4:
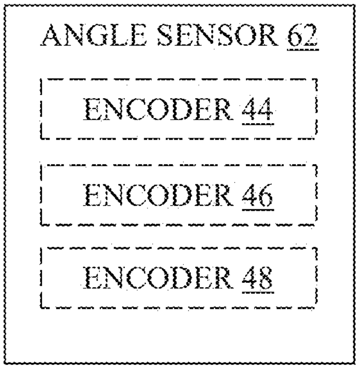
FIG. 4 is a block diagram view of an angle sensor of the angle sensor of FIG. 3.
Figure 5:
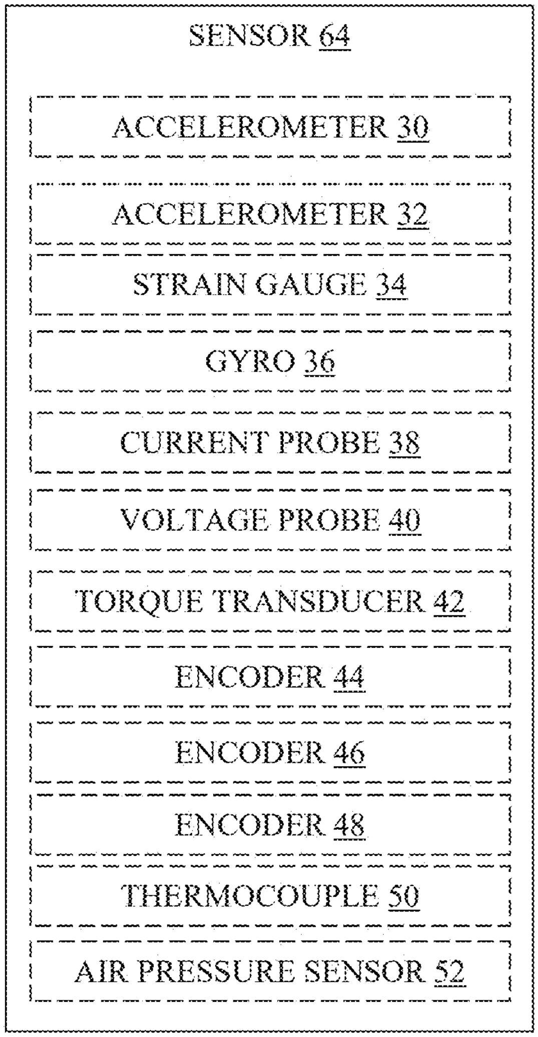
FIG. 5 is a block diagram view of a sensor of the one or more sensors of FIG. 3.

As shown in FIG. 3, a schematic representation of electrical components of the power tool 10 is depicted. In general, the power tool 10 includes a controller 60 that is communicatively coupled and configured to receive corresponding sensor measurements from an angle sensor 62 and one or more sensors 64. In various embodiments, the angle sensor 62 includes, but is not limited to, encoder 44, encoder 46, encoder 48. In various embodiments, the sensors 64 of power tool 10 include, but are not limited to, accelerometer 30, accelerometer 32, strain gauge 34, gyro 36, current probe 38, voltage probe 40, torque transducer 42, thermocouple 50, air pressure sensor 52 are each communicatively coupled to controller 60. However, it should be understood and appreciated that power tool 10 is not limited to include the entirety of all the sensors listed herein, but may include any one angle sensor 62 and sensor 64 or any combination of sensors.

In general, controller 60 is configured to receive one or more sensor measurements (i.e., electrical signals) corresponding to the one or more sensors of power tool 10. Controller 14 then determines an estimated torque output (utilizing any one of the energy value formulas disclosed herein) of the power tool 10 based on the one or more sensors. In embodiments, controller 60 is communicatively coupled to operatively control motor 12 based on the determined estimated torque value. For example, controller 60 may control power (e.g., throttle motor current, throttle motor voltage, motor timing, etc.) to the motor 12 when the estimated torque T applied to the nut 28 satisfies the preset torque setting to ensure proper tightening of the nut 28.

Although the above formula may be used as a basic estimate of torque applied to a fastener 28, the formula assumes perfect energy transfer from the drive mechanism 16 to the nut 28 and does not account for the efficiency of such energy transfer. Thus, an improved formula would adjust the energy value based on energy losses (or contributions) that change the actual energy transferred to the nut 28. Thus, the energy value in the above formula may be substituted with an actual energy as determined by the following formula:

$$E_{Actual} = E_H - E_V - E_M - E_T - E_S$$

where $E_{Actual}$ is an estimate of the actual energy transferred to the nut 28 which may be used in the formula above to determine the estimated applied torque, $E_H$ is the change in energy of the hammer 16 which may be the same value used in the basic formula above, $E_V$ is the energy of tool vibrations associated with an impact, $E_M$ is the energy of tool movements during the impact, $E_T$ is the energy of temperature changes during impact, and $E_S$ is the energy of tool sounds caused by the impact. It is also possible to recharacterize the above formula in terms of efficiency of torque transfer if desired (e.g., with other mathematical operators). For example, the loss in energy (or energy difference) can also be determined by controller 60 by multiplying the hammer energy $E_H$ by an efficiency factor. Sensor data from one or more sensors on the tool could be used by controller 60 to determine the efficiency factor for individual blows of the hammer as the tool is operated. For example, using prior testing of the tool, an efficiency correlation between data generated by the sensors and the efficiency factor can be formulated by controller 60. Controller 60 may store the efficiency correlation on a memory device and apply the efficiency correlation to the sensor data generated during tool use to provide the efficiency factor, which can be varied as the tool is being used based on changing sensor data. It is understood that while tool vibrations and tool movements may be related to each other, tool vibrations have a frequency which are typically a multiple of the impact frequency, whereas tool movements may be other tool movements not considered to be vibrations.

Energy estimates may be made for each of the above energy values using a variety of sensors. Therefore, the energy formula above may be rewritten in terms of the sensors that may be used to estimate energy losses (or contributions) to be subtracted from the energy of the hammer 16. Thus, the rewritten formula may be:

$$E_{Actual} = E_H - E_A - E_{St} - E_G - E_I - E_{VIt} - E_{TT} - E_E - E_{Tc} - E_{AP}$$

where $E_{Actual}$ and $E_H$ are described above, $E_A$ is the energy determined from an accelerometer, $E_{St}$ is the energy determined from a strain gauge, $E_G$ is the energy determined from a gyro, $E_T$ is the energy determined from a current probe, $E_{VIt}$ is the energy determined from a voltage probe, $E_{TT}$ is the energy determined from a torque transducer, $E_{Tc}$ is the energy determined from a thermocouple, and $E_{AP}$ is the energy determined from an air pressure sensor (e.g., a microphone).

It is understood that the above formulas may be modified as desired for a particular power tool. For example, it is possible to apply a factor to one or more energy values where it is determined that only a portion of the estimated energy associated with a condition or sensor is attributable to an energy loss (or contribution) transferred from the drive mechanism 16 to the output shaft 22. It is also possible that a smaller or greater number of conditions or sensors may be included in the actual energy estimate. Multiple sensors of the same type may also be used in various locations of the power tool 10 to improve the actual energy estimate. Further, multiple sensors may be used together to determine a particular energy estimate.

In embodiments, controller 60 is communicatively coupled to an angle sensor 62 and one or more sensors 64. Examples of sensors that may be used to estimate energy losses (or contributions) are shown in FIG. 1. One sensor that may be used is an accelerometer 30, 32. Accelerometers 30, 32 may be located on the drive mechanism 16 and/or the tool housing 24. The accelerometers 30, 32 may be used to determine vibration energy or movement energy measured on the drive mechanism 16 and/or tool housing 24. Another sensor that may be used is a strain gauge 34. A strain gauge 34 may be located on the tool housing 24 to determine vibration energy or movement energy measured on the tool housing 24. Another sensor that may be used is a gyro 36. A gyro 36 may be located on the tool housing 24 to determine movement energy or vibration energy measured on the tool housing 24. Another sensor that may be used is a current probe 38. A current probe 38 may be electrically connected to the motor 12 to measure the current of the motor 12 which may be used to determine movement energy or vibration energy. Another sensor that may be used is a voltage probe 40. A voltage probe 40 may be electrically connected to the motor 12 to measure the voltage of the motor 12 which may be used to determine movement energy or vibration energy. It is understood that the current probe 38 and voltage probe 40 may also be used together to determine the power of the motor 12 which may also be used to determine movement energy or vibration energy. Another sensor that may be used is a torque transducer 42. A torque transducer 42 may be located on the motor 12 to measure the torque of the motor 12 on the drive shaft 14 or the motor 12 housing in order to determine movement energy or vibration energy. Another sensor that may be used is an encoder 44, 46, 48. Encoders 44, 46, 48 may be located on the output shaft 22 near a distal end, on the output shaft 22 near a proximal end, and/or on the drive mechanism 16. Differences in angular position between any of the encoders 44 may be used to determine movement energy or vibration energy. It is understood that the encoders 44, 46, 48 may also be used to determine the energy of the hammer $E_H$ as described above (especially the encoder 48 located on the drive mechanism) and the angular rotation AR described above (especially one of the encoders on the output shaft 44, 46), i.e., encoders 44, 46, 48 may be used as angle sensor 62. Another sensor that may be used is a thermocouple 50. A thermocouple 50 may be located adjacent the output shaft 22 (including next to an output shaft bushing) to determine temperature energy. Another sensor that may be used is an air pressure sensor 52. An air pressure sensor 52 (e.g., a microphone 52) may be located on the tool housing 24 to determine sound energy produced by the drive mechanism 16. It is understood that a sensor may be used to determine more than one type of energy (e.g., both a vibration energy and a movement energy) or a single type of energy if desired.

The controller 60 may comprise a processor configured to execute computer readable program instructions (i.e., control logic) from a non-transitory carrier medium (e.g., storage medium such as a flash drive, solid-state disk drive, SD card, or the like). The program instructions, when executing by the processor, can cause the controller 60 to control the power tool 10 (e.g., controlling power supplied to motor 12). In an implementation, the program instructions form at least a portion of software programs for execution by the processor.

The processor provides processing functionality for the controller 60 and power tool 10 and may comprise any number of processors, micro-controllers, or other processing systems, and resident or external memory for storing data and other information accessed or generated by the computing system. The processor is not limited by the materials from which it is formed or the processing mechanisms employed therein.

The non-transitory carrier medium is an example of device-readable storage media that provides storage functionality to store various data associated with the operation of the controller 60, such as firmware, a software program, code segments, or program instructions, or other data to instruct the processor and other elements of the controller 60 and power tool 10 to perform the methods described herein. The carrier medium may be integral with the processor, stand-alone memory, or a combination of both. The carrier medium may include, for example, removable and non-removable memory elements such as RAM, ROM, Flash (e.g., SD Card, mini-SD card, micro-SD Card), USB memory devices, and so forth. In embodiments of the computing system, the carrier medium may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The power tool 10 may be monitored and/or controlled by one or more computing systems that may communicate with the controller 60. The one or more computing systems can be connected to the controller 60 of the power tool 10, either by direct connection, or through one or more network connections (e.g., local area networking (LAN), controller area network (CAN), etc.), wireless area networking (WAN or WLAN), one or more hub connections (e.g., USB hubs), and so forth). For example, the one or more computing systems can be communicatively coupled (e.g., hard-wired or wirelessly) to the controller 60 of the power tool 10.

In some embodiments, the power tool 10 may further include one or more input/output (I/O) devices (e.g., a trigger, a keypad, buttons, a display/touchscreen, a speaker, etc.) that communicate with the controller 60 to allow a user to operate and control settings of the power tool 10.

The controller 60 may also include a communication device to permit the controller 60 to send/receive data over the one or more networks. The communication device may, for example, comprise a transmitter and/or receiver; data ports; software interfaces and drivers; networking interfaces; data processing components; and so forth.

The one or more networks are representative of a variety of different communication pathways and network connections which may be employed, individually or in combinations, to facilitate communication between external computing devices and the controller 60 of the power tool 10. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

While various embodiments of the power tool 10 have been described, it should be understood that the embodiments are not so limited, and modifications may be made without departing from the embodiments herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the tool, and it is not necessarily expected that all of the described advantages will be achieved with every embodiment of the tool. Other examples may occur to those skilled in the art based on the present disclosure. Such other examples are intended to be within the scope of the present disclosure.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method of controlling a power tool, comprising:

measuring, via a first sensor, an angle of rotation of an output shaft of the power tool in response to a hammer mechanism rotating the output shaft;

determining, via a controller communicatively coupled to the first sensor, the angle of rotation based on the measurement of the first sensor;

determining, via the controller, a first energy value of the power tool based on the determined angle of rotation, the first energy value being a change of energy of the hammer mechanism during the angle of rotation;

measuring, via a second sensor, a second energy value of the power tool, the second energy value being an energy loss from the first energy to a component of the power tool different from the output shaft during the angle of rotation;

determining, via the controller communicatively coupled to the second sensor, the second energy value;

determining, via the controller, an applied torque to the output shaft based on an energy difference between the first energy value and the second energy value, the energy difference being an estimate of energy transferred to the output shaft with the energy loss removed; and controlling, via the controller, a motor of the power tool based on the determined applied torque.

2. The method according to claim 1, further comprising switching off an electric motor driving the hammer mechanism when the applied torque satisfies a preset torque setting.

3. The method according to claim 1, wherein the first energy value is determined based on a speed difference of the hammer mechanism before and after driving the output shaft through the angle of rotation.

4. The method according to claim 1, wherein the power tool is an impact wrench.

5. The method according to claim 1, wherein the second energy value is a tool vibration energy, a tool movement energy, a tool temperature energy or a tool sound energy.

6. The method according to claim 5, wherein the second energy value is a tool vibration energy determined from an accelerometer, a strain gauge, a gyro, a motor current probe, a motor voltage probe or a torque transducer.

7. The method according to claim 6, wherein the tool vibration energy is determined from the accelerometer, the accelerometer being disposed on the hammer mechanism driving the output shaft.

8. The method according to claim 6, wherein the tool vibration energy is determined from the accelerometer, the accelerometer being disposed on a tool housing encompassing the hammer mechanism driving the output shaft.

9. The method according to claim 6, wherein the tool vibration energy is determined from the strain gauge, the strain gauge being disposed on a tool housing encompassing the hammer mechanism driving the output shaft.

10. The method according to claim 6, wherein the tool vibration energy is determined from the gyro, the gyro being disposed on a tool housing encompassing the hammer mechanism driving the output shaft.

11. The method according to claim 6, wherein the tool vibration energy is determined from the motor current probe and/or the motor voltage probe, the motor current probe and/or the motor voltage probe outputting a current and voltage, respectively, of an electric motor driving the hammer mechanism which drives the output shaft.

12. The method according to claim 6, wherein the tool vibration energy is determined from the torque transducer, the torque transducer outputting a torque of an electric motor driving the hammer mechanism which drives the output shaft.

13. The method according to claim 5, wherein the second energy value is a tool movement energy determined from an encoder, a gyro, a motor current probe, a motor voltage probe, a torque transducer, an accelerometer, or a strain gauge.

14. The method according to claim 13, wherein the tool movement energy is determined from the encoder, the encoder being disposed on the output shaft.

15. The method according to claim 13, wherein the tool movement energy is determined from the gyro, the gyro being disposed on a tool housing encompassing the hammer mechanism driving the output shaft.

16. The method according to claim 13, wherein the tool movement energy is determined from the motor current probe and/or the motor voltage probe, the motor current probe and/or the motor voltage probe outputting a current and voltage, respectively, of an electric motor driving the hammer mechanism which drives the output shaft.

17. The method according to claim 5, wherein the second energy value is a tool temperature energy determined from a thermocouple.

18. The method according to claim 17, wherein the thermocouple is disposed adjacent the output shaft.

19. The method according to claim 5, wherein the second energy value is a tool sound energy determined from an air pressure sensor.

20. The method according to claim 1, wherein the energy difference between the first energy and the second energy is determined by multiplying the first energy value by an efficiency factor, the efficiency factor being determined from sensor data from one or more sensors on the power tool and an efficiency correlation stored on the tool between the sensor data and the efficiency factor.

* * * * *